(12) United States Patent
Jensen et al.

(10) Patent No.: US 8,489,846 B1
(45) Date of Patent: Jul. 16, 2013

(54) PARTITION PROCESSING SYSTEM AND METHOD FOR REDUCING COMPUTING PROBLEMS

(75) Inventors: David W. Jensen, Marion, IA (US); Steven E. Koenck, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1305 days.

(21) Appl. No.: 11/166,699

(22) Filed: Jun. 24, 2005

(51) Int. Cl.
*G06F 12/00* (2006.01)

(52) U.S. Cl.
USPC .................................. 711/173; 711/E21.091

(58) Field of Classification Search
USPC .................................................. 711/E12.091
See application file for complete search history.

(56) References Cited

U.S. PATENT DOCUMENTS

| | | | |
|---|---|---|---|
| 5,535,203 A | 7/1996 | Alatalo et al. | 370/66 |
| 5,555,245 A | 9/1996 | Alatalo et al. | 370/66 |
| 5,570,358 A | 10/1996 | Alatalo et al. | 370/58.2 |
| 5,627,992 A | 5/1997 | Baror | 395/460 |
| 5,787,490 A | 7/1998 | Ozawa | 711/173 |
| 5,875,464 A | 2/1999 | Kirk | 711/129 |
| 6,014,728 A | 1/2000 | Baror | 711/133 |
| 6,026,471 A | 2/2000 | Goodnow et al. | 711/137 |
| 6,131,166 A * | 10/2000 | Wong-Insley | 713/300 |
| 6,295,580 B1 | 9/2001 | Sturges et al. | 711/129 |
| 6,317,872 B1 | 11/2001 | Gee et al. | 717/7 |
| 6,374,286 B1 | 4/2002 | Gee et al. | 709/108 |
| 6,438,677 B1 | 8/2002 | Chaudhry et al. | 712/27 |
| 6,587,937 B1 | 7/2003 | Jensen et al. | 711/173 |
| 2003/0187904 A1* | 10/2003 | Bennett et al. | 709/1 |
| 2004/0128550 A1* | 7/2004 | Govindarajan et al. | 713/201 |
| 2006/0075499 A1* | 4/2006 | Edwards et al. | 726/24 |

OTHER PUBLICATIONS

Crazy Chuckster et al. Trend Micro Online Virus/Spyware Scanner HouseCall 6.0. In PC Perspective Forums [online]. May 8, 2005 [retrieved on Apr. 14, 2008]. Retrieved from the Internet: <URL:http://forums.pcper.com/showthread.php?t=388888>.*
aJile Systems. aJ-80(tm) Real-time Low Power Java(tm) Processor. Apr. 9, 2001 [online], [retrieved on Jan. 30, 2009]. Retrieved from the Internet <URL: http://datasheet.digchip.com/552/aJ-80Datasheet.pdf>.*

* cited by examiner

*Primary Examiner* — Larry Mackall
(74) *Attorney, Agent, or Firm* — Donna P. Suchy; Daniel M. Barbieri

(57) ABSTRACT

A computing system includes a processor and a partition management unit (PMU). The partition management unit allocates partitions of memory and processing time. The PMU can allocate a partition for at least one of the following: 1. a service attack monitor, 2. a virus monitor, 3. a spyware monitor, and 4. a deterministic routine, the deterministic routine being in a separate partition and from a non-deterministic routine. In an alternative, with transition of control between partitions, the computing system enforces 1. a power management mode change, and 2. a preload or change to at least, one of the cache data peripheral settings or FPGA content mode change.

19 Claims, 6 Drawing Sheets

PARTITION PROCESSING SYSTEM AND METHOD FOR REDUCING COMPUTING PROBLEMS

FIELD OF THE INVENTION

The patent application relates to computing systems. More particularly, the patent application relates to the use of partitioning technology to alleviate problems associated with computer environments.

BACKGROUND OF THE INVENTION

There are many computing environments in use today where multiple applications are operated simultaneously. To ensure security, integrity and reliability, the applications must not interfere with each other. Important examples of such multiple computing environments include avionics software that controls critical flight functions and national security applications that manage critical classified information. In these environments, the conventional approach has been to dedicate multiple, independent and physically-separate computer systems to ensure the separation of the critical information.

A particular example of an independent computer system being used for each unique function involves avionics and communications equipment, such as autopilots, flight management systems, and displays. The avionics computer systems offer only limited interfunctional dependencies in that they exchange sensor and control data. This computer system architecture provides strong functional isolation needed for critical avionics systems. Avionics systems typically must be certified to meet reliability standards established by regulatory agencies such as the Federal Aviation Administration. System certification involves verifying that all system components work properly together and that no fault can propagate from one system component to another.

In order to reduce hardware costs, power, and size involved with multiple commercial and custom high performance microprocessors, it may be beneficial to provide one computer system to perform many distinct functions in avionics, communications, and other equipment. Having one computer system may substantially reduce certification costs in avionics systems. System functions may be certified once, independently, and to the level appropriate to their criticality while a composition of functions may retain, individual certification.

Many different functions can be performed on a single computer system by using virtual machines. A virtual machine is a platform-independent instruction set or routine that provides a portable programming environment to users. Multiple virtual machines can run on a single physical processor through sharing or partitioning of the physical processor operation. The multiple virtual machines perform as if they were separate physical machines operating on a single processor. A well-known virtual machine is the JAVA virtual machine.

With a single computer system, the avionics functions are no longer physically isolated. Interaction of functions must be considered if physical isolation is not provided. Partitioning of functions must provide the necessary isolation for safety critical avionics applications such that each function is guaranteed not to be affected by the operation of any other function.

Multiple virtual machines have applications to many areas including avionics and communications products. Partitioning can have applications outside of the avionics and communication areas. Partitioning and multiple virtual machines can provide direct cost advantages in software development. Multiple levels of certified software can co-exist on the same processor. Software can be certified once and re-used in multiple application environments. These advantages are possible with brick-walled partitioning comprising partition management and deterministic execution.

U.S. Pat. No. 6,587,937, the entire contents of which is incorporated herein by reference, discloses a partition management unit (PMU) to meet avionics and security requirements and eliminate the need for multiple, physically-separate computer systems. U.S. Pat. No. 6,587,937 is assigned to the Assignee of the patent application and lists David W. Jensen and Steven E. Koenck as inventors.

The AAMP7 processor in the Selective Availability Anti-Spoofing Module (SAASM) system, manufactured by Rockwell Collins, Inc., has been employed in military systems to achieve partitioning. The AAMP7 processor includes a partition management unit (PMU). The partition management unit allows virtual machines to meet avionics and security requirements by ensuring the physical and temporal separation of applications and eliminates the need for multiple, physically-separate computer systems. The PMU is programmed to provide each partition access only to its allocated resources. The allocated resources are generally memory space, processing time, and/or peripheral devices.

The PMU architecture is similar to a memory management unit (MMU) architecture found on conventional computer systems. However, the PMU not only enforces memory management protocols, but also ensures that each partition consumes no more than its allocation of process time. The PMU can monitor the process via a watchdog timer and generate a non-maskable partition interrupt to force synchronization. This temporal partitioning allows the system designer to enforce not only worst case timing but best case timing. This "invariant performance" allows the operation of the application in the partition to be absolutely independent of the other partitions. Thus, any validation or verification is guaranteed for any component in the composed system, thereby easing the development of applications. Heretofore, such systems have not been employed outside of avionic and security computing systems.

Conventional computing systems have been susceptible to various problems. The problems can be caused by external access, control loops involving non-deterministic routines and power and configuration modes. Each of these sources of problems can cause a processor to be overwhelmed or cause the computing application to be slow, inaccurate or unstable. For example, service attacks and other Internet attacks can overwhelm a processor with service requests. Denying the service requests can require a large amount of processing time, thereby preventing the processor from appropriately managing other tasks. The processor can be overwhelmed by a large number of service requests and the time spent processing and monitoring those service requests can prevent other tasks from receiving appropriate processing resources. These conventional problems have not been solved using conventional computing techniques.

According to another example, virus and spyware software is becoming increasingly sophisticated. Virus and spyware software can operate at system levels and can be configured to make removal from the system difficult. Conventional anti-virus and anti-spyware software currently operates at the same priority and access level as other software and can interfere with such software.

According to another example, conventional computing systems can have difficulty with simultaneous operation of deterministic and non-deterministic software in control applications. Control loops or other routines in robotics and avionics typically require deterministic operation. Timing loops must be accurate for appropriate feedback and for the mathematical foundations associated with the control loops to operate correctly. If non-deterministic software requires more time than anticipated, critical timing loops cannot be supported and may malfunction, thereby affecting the integrity and behavior of deterministic control loops.

In yet another example, conventional computer systems can utilize power management software to transition from one power management mode to another. Generally, changes to such parameters may require a restart of the computers or may affect the stability of existing programs. The management power may involve dynamic voltage settings, frequency scaling, and/or power settings for peripheral devices.

In yet another example, conventional systems generally cannot allow configuration of cache data, peripheral settings, and field programmable gate array (FPGA) content to be dynamically changed. Power performance and security can be adjusted by changes to the cache data settings, peripheral settings and FPGA content. Changing and/or preloading these devices may radically change the operation of the processing system thereby compromising reliable transition from one provable stable state to another provable stable state.

Thus, there is a need to employ a PMU to solve certain problems associated with conventional computer environments. Further, there is a need to provide greater security, reliability and integrity by using a PMU in generalized computing environments. Yet further, there is a need for a computer system that provides a PMU to eliminate computing problems associated with network denial of service attacks, virus and spyware software, separation of deterministic and non-deterministic software, power management, and instability related to cache data, peripheral settings, and FPGA contents.

SUMMARY OF THE INVENTION

An exemplary embodiment relates to a computing system including a processor and a partition management unit (PMU). The PMU allocates partitions of memory and processing time. The PMU allocates a partition for at least one of the following: 1. a service attack monitor, 2. a virus monitor, 3. a spyware monitor, and 4. a deterministic loop. The deterministic loop is preferably in a separate partition from a non-deterministic loop.

Another exemplary embodiment relates to a computing system. The computing system includes a processor and a partition management unit (PMU). The partition management unit allocates partitions of memory and processing time, wherein the computing system enforces at least one of the following configuration changes during partition changes: 1. a partition management mode, and 2. a preload or change to at least one of the cache data, peripheral settings, or FPGA content mode.

Another exemplary embodiment relates to a computing system apparatus. The apparatus includes processor means for executing instructions associated with software. The software includes the first routine and at least one of: 1. a service attack monitor routine, 2. a virus monitor routine, 3. a spyware monitor routine, 4. a deterministic routine, 5. a power management routine, and 6. a preload or change to at least one data cache, peripheral settings, or FPGA contents. The apparatus isolates the operation of the first routine from at least one of: 1. a service attack monitor routine, 2. a virus monitor routine, 3. a spyware monitor routine, 4. a deterministic routine.

Yet another exemplary embodiment relates to a method of operating a computer system. The method includes operating a first virtual machine associated with a first partition, and operating a second virtual machine associated with a second partition. The second virtual machine perform at least one of: 1. a service attack monitor routine, 2. a virus monitor routine, 3. a spyware monitor routine, 4. a non-deterministic routine, 5. a power management routine, and 6. a preload or change to at least one of a data cache, peripheral settings or FPGA content routine.

Another exemplary embodiment relates to a method of operating a computer system. The method includes operating a first virtual machine associated with a first partition and operating a second virtual machine associated with a second partition. The first virtual machine operates a classified application and the second virtual machine operates an unclassified application. Alternatively, the first virtual machine operates a safety critical application and the second virtual machine operates a non-safety critical application. In another alternative, the first virtual machine operates a trusted application and the second virtual machine operates an untrusted application.

BRIEF DESCRIPTION OF THE DRAWINGS

The preferred exemplary embodiments are hereinafter described with reference to the accompanying drawings, wherein like numerals denote like elements, and.

DETAILED DESCRIPTION OF THE PREFERRED EMBODIMENTS

Figure 1:
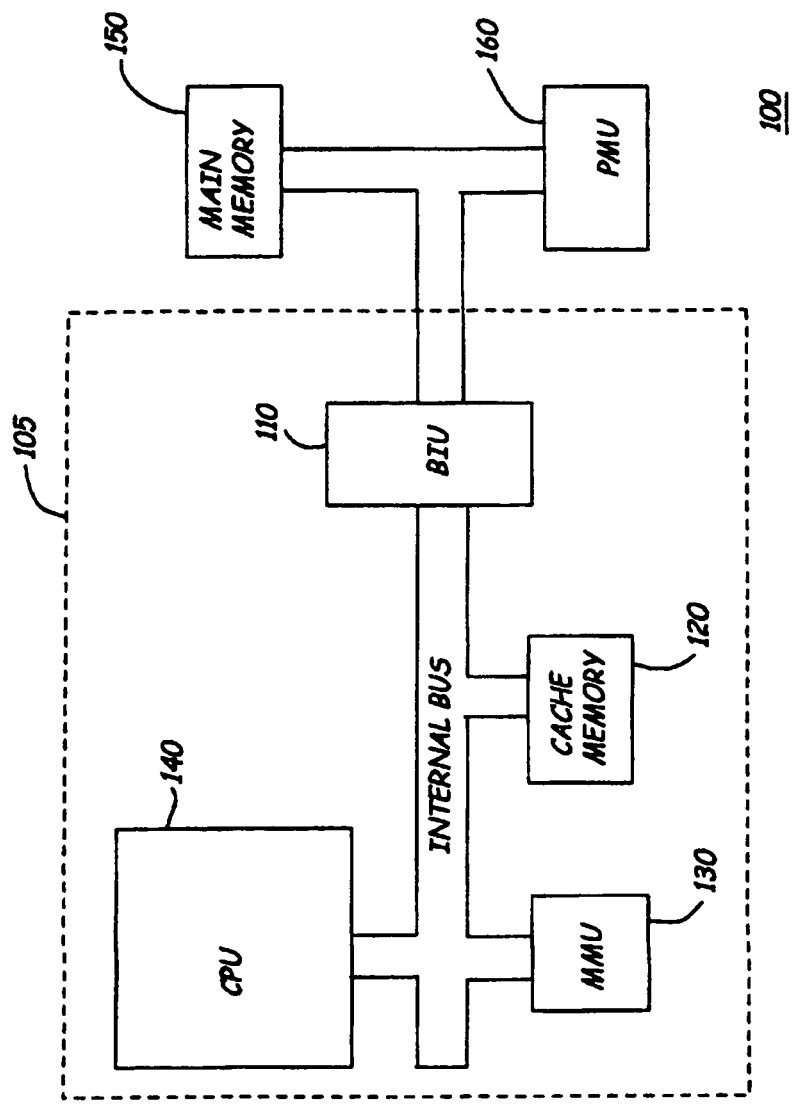
FIG. 1 is a general schematic block diagram of a computer system including a processor and a memory in accordance with an exemplary embodiment of the present invention.

A computer system 100 is shown in block diagram form in FIG. 1. Computer system 100 includes a microprocessor 105 comprising a bus interface unit 110, on-chip cache memory 120, a memory management unit 130, and a central processing unit 140. Alternatively, computer system 100 can have bus interface unit 110, memory 120, memory management unit 130 and central processing unit 140 as separate units. A main memory 150 may be external to the microprocessor 105.

One computer system 100 as shown in FIG. 1 may be used for many distinct functions to reduce hardware costs if the computer has capacity to perform all the processing tasks. Operating several software functions on one computer system can be efficient and cost effective. Software development and testing costs for these applications can be substantially reduced if it can be shown that the software functions are isolated from each other. System 100 can be embodied as an X86-based, Power PC-based system, ARM-based system, or any other microprocessor type.

Virtual machines can be operated on a computer system 100 as shown in FIG. 1 to perform many different functions. A virtual machine is a platform-independent instruction set that provides the user with a portable programming environment. Multiple virtual machines can run on a single physical processor through sharing or partitioning of the physical processor operation. Alternatively, system 100 can operate separate routines, subroutines, control loops, etc., instead of virtual machines.

When multiple virtual machines are operating on a single processor, each virtual machine has its own operating time slice. There must be isolation between the multiple virtual machines (or routines, subroutines, control loops, etc.) to avoid interaction between them. Partitioning isolates the two or more virtual machines (or routines, subroutines, control loops, etc.) running on a physical processor to an acceptable degree. The isolation between the multiple virtual machines must be both in space and time. To obtain temporal isolation, periodic partition switching of the virtual machines is employed. Each virtual machine (or routines, subroutines, control loops, etc.) operates in its own time slice, slot or partition. To obtain spatial isolation, memory read/write protection must be provided between the partitions.

A partition management unit (PMU) 160 is preferably added to the computer system 100 of FIG. 1 to maintain isolation between the multiple virtual machines (or routines, subroutines, control loops, etc.). By way of example, PMU (160) can be implemented in hardware as a FPGA (field programmable gate array) or as an ASIC (application specific integrated circuit). Alternatively, functions of PMU 160 can be implemented in software in most known operating systems and run time executives. According to an alternative embodiment, PMU 160 is the type employed in the SAASM system manufactured by a Rockwell Collins, Inc. and configured for operation according to FIGS. 5 and 6. PMU 160 can be implemented in any number of fashions without departing from the scope of the invention.

Figure 2:
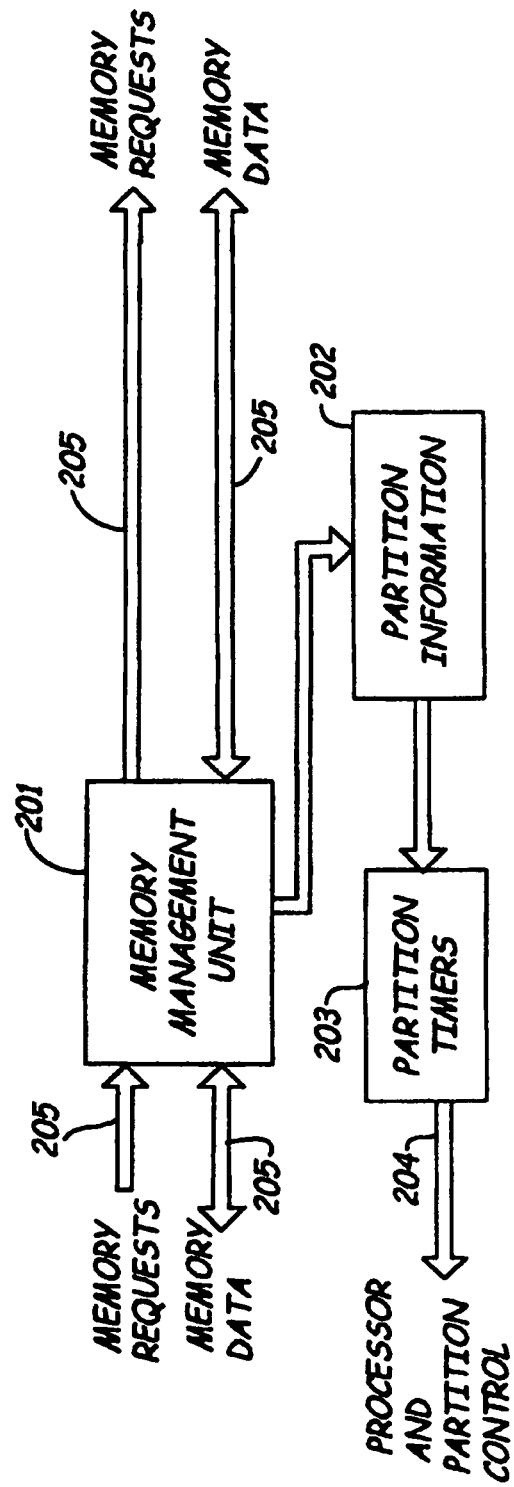
FIG. 2 is a more detailed schematic block diagram of the processor including a supervisor process fetch unit and a number of non-supervisor process fetch units illustrated in FIG. 1 in accordance with another exemplary embodiment of the present invention.

An exemplary block diagram of a PMU 200 is shown in FIG. 2. PMU 200 contains memory protection logic in the form of a memory management unit 201 to enforce access rights for each partition to its appropriate memory region. The memory protection logic contains the functionality of a conventional microprocessor memory management unit (MMU) known in the art. Interfaces to MMU 201 include memory and data busses 205. PMU 200 contains information that may be stored in a memory 202 for each partition in the system. This information provides address range values, execution time limits, and scheduling protocols. A partition timer 203 signals microprocessor 105 to perform a partition context switch and loads the new partition information from memory 202 into the MMU 201. PMU 200 can contain general-purpose timers (not shown), which may include delay timers, tick timers, and clock timers. Conventional microprocessor interfaces 204 may include resets, interrupts, and other signals to control partition context switching and to report memory range violations. PMU 200 integrates the functionality of an MMU and operating system context switching in a single hardware design. This design provides assurance for proper access to memory (space) and proper execution duration (time). PMU 200 is shown in an exemplary fashion and can be implemented in a variety of fashions without departing from the scope of the invention.

Cache memories can be used in computers to provide considerable improvements in speed. A cache memory 120 is shown in FIG. 1. Data is read into a small cache memory 120 and then accessed from the cache at high speed instead of a relatively slow large main memory 150. Cache memory 120 may be part of microprocessor 105 or a separate memory chip (not shown). Cache memories can be used with multiple virtual machines but spatial isolation between the partitions must be maintained.

There are several ways that may be used to manage the virtual machine/cache memory relationship to improve speed and maintain isolation between the multiple virtual machines. One approach is to always completely flush the cache memory before changing to a new virtual machine context. This approach is of particular interest to security applications that require that no artifacts of a particular segment of code or data is accessible accidentally to another. However flushing the cache significantly degrades performance and speed because the cache must be refilled from the relatively slow main memory. Another approach is taught by previously mentioned U.S. Pat. No. 6,587,937 which describes an efficient cache system for multiple virtual machines.

Deterministic behavior is essential for a computer architecture to support avionics platforms. Deterministic behavior occurs when the processor execution can be predicted or predetermined at any time. With deterministic execution only one step follows another with no choices or alternates in the execution. Caching is essential for a high-performance microprocessor to obtain high-speed operation. The currently known ways of providing caching and deterministic behavior are to replicate the cache, i.e. provide a dedicated cache for each virtual machine, or to flush the cache when changing to a new virtual machine. This is undesirable for multiple virtual machines because of the required silicon chip real estate and the performance degradation.

Figure 3:
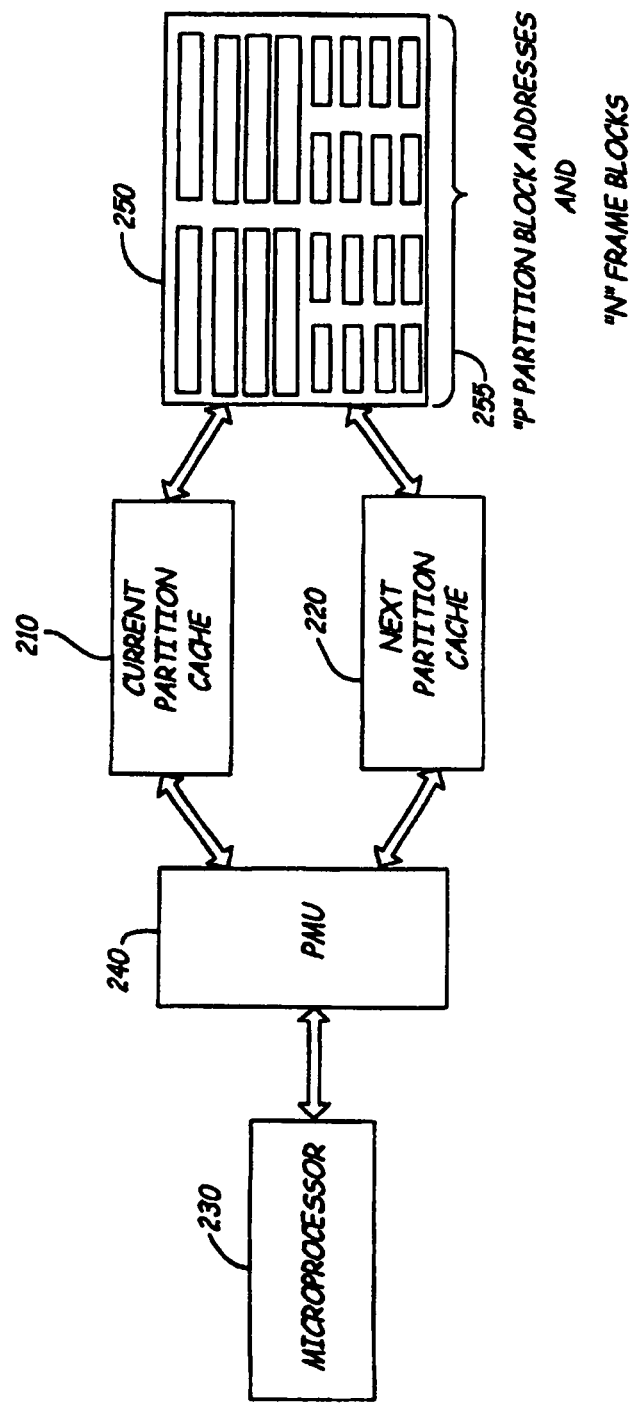
FIG. 3 is a more detailed block diagram of the supervisor process fetch unit and one of the non-supervisor process fetch unit illustrated in FIG. 2 in accordance with yet another exemplary embodiment of the present invention.
Figure 4:
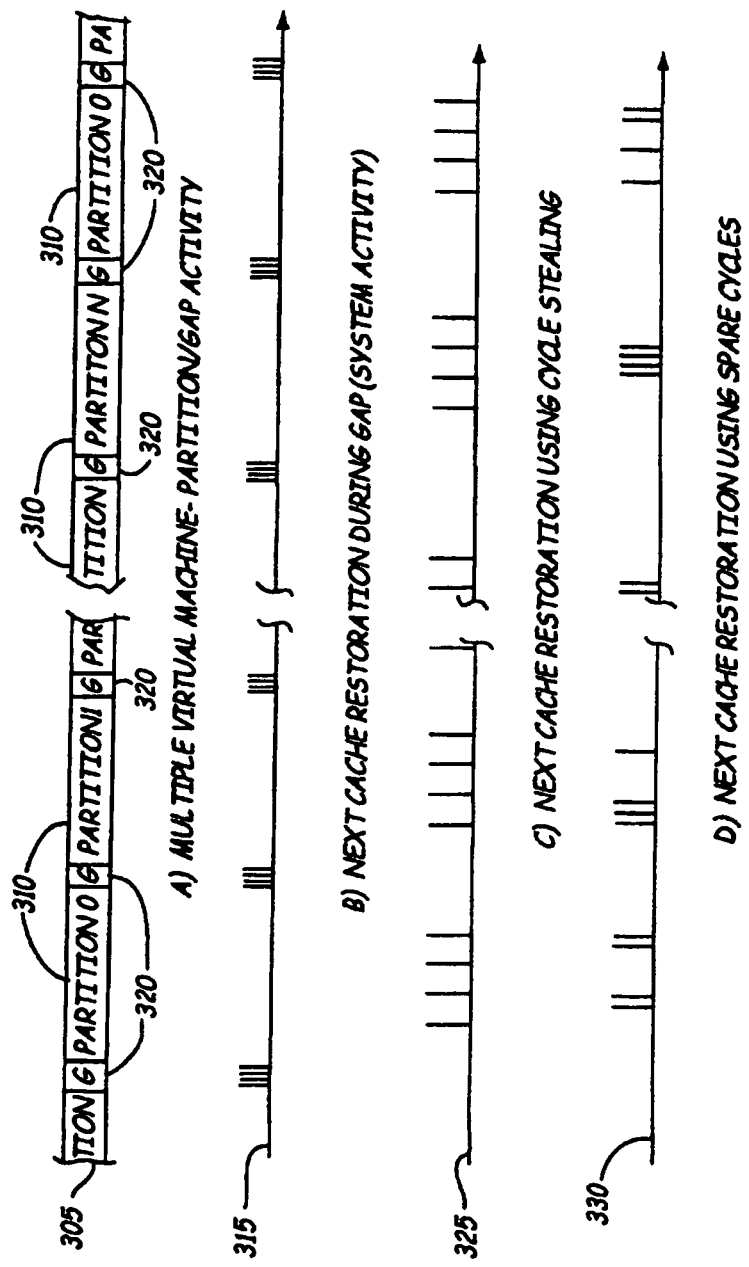
FIG. 4 is a flow diagram for the computing system illustrated in FIG. 1 in accordance with still another exemplary embodiment of the present invention.

In FIG. 3 the microprocessor 230 executes instructions for one of P partitions. The microprocessor 230 issues memory reads and writes to partition management unit (PMU) 240. PMU 240 resolves all memory read and write accesses such that the virtual machine associated with a partition can access only its allowed memory space. PMU 240 directs valid memory reads and writes to the current partition cache 210. When the next partition becomes active PMU 240 swaps the roles of current partition cache 210 and next partition cache 220. Current partition cache 210 resolves memory read hits immediately and resolves read misses by reading external memory 250. Write through caching maintains coherency with the external memory 250. Next partition cache 220 may be active during the current partition execution. External memory 250 contains data organized in frame blocks 255 and also contains cache block addresses 258 for the partitions active in the system. Without disrupting the current partition, the microprocessor, through PMU 240, reads appropriate frame blocks 255 from external memory 250 to next partition cache 220. This can occur by cycle stealing from the current partition as shown by 325 in FIG. 4 or by using spare cycles from the current partition. Otherwise next partition cache 220 may be restored during gaps 320 between partitions as shown by 305 in FIG. 4. This activity restores next partition cache 220 to the previous state of the next partition to be active.

Figure 5:
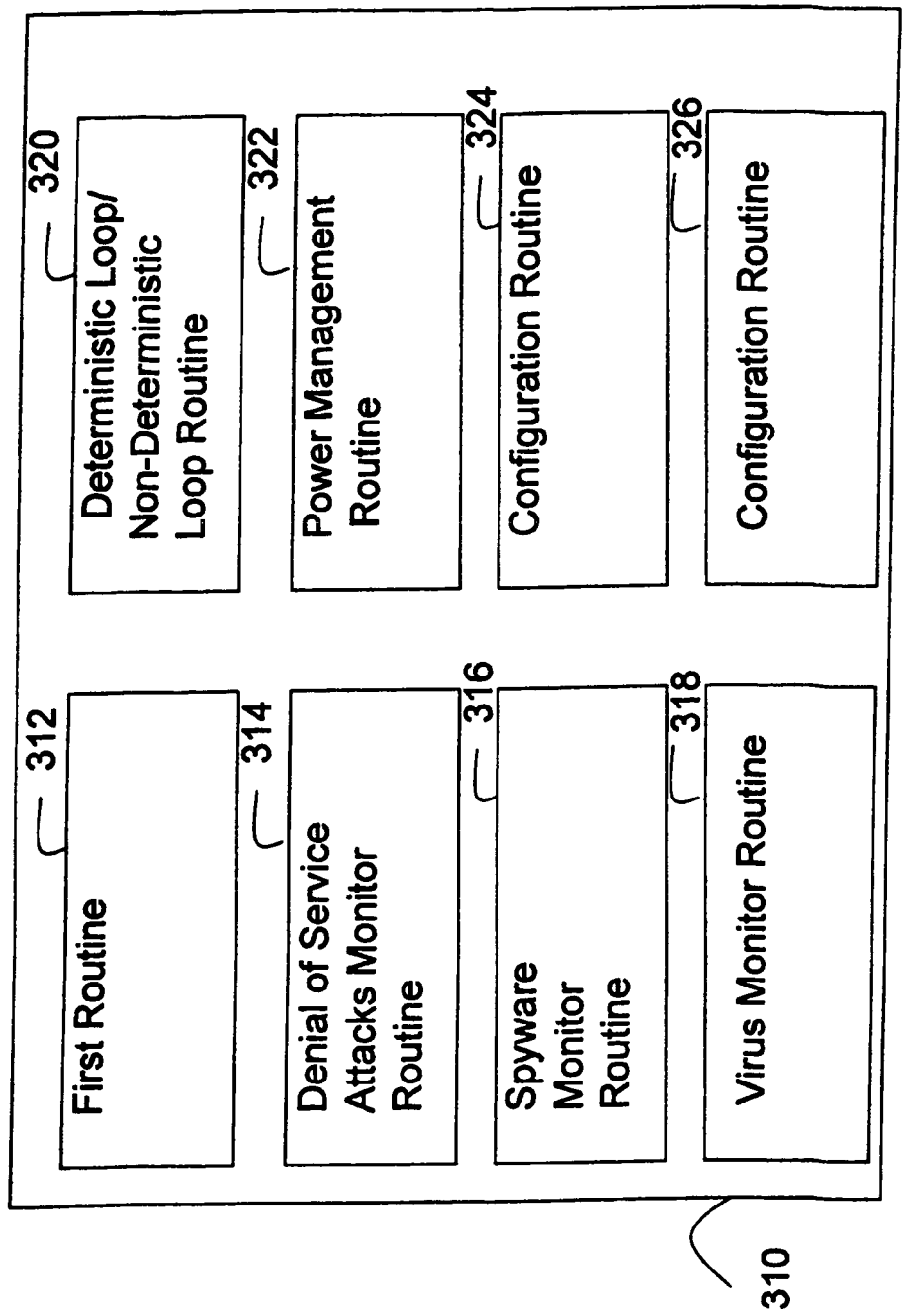
FIG. 5 is a more detailed block diagram of routines that operate on the computer system illustrated in FIG. 1 in accordance with yet still another exemplary embodiment of the present invention.
Figure 6:
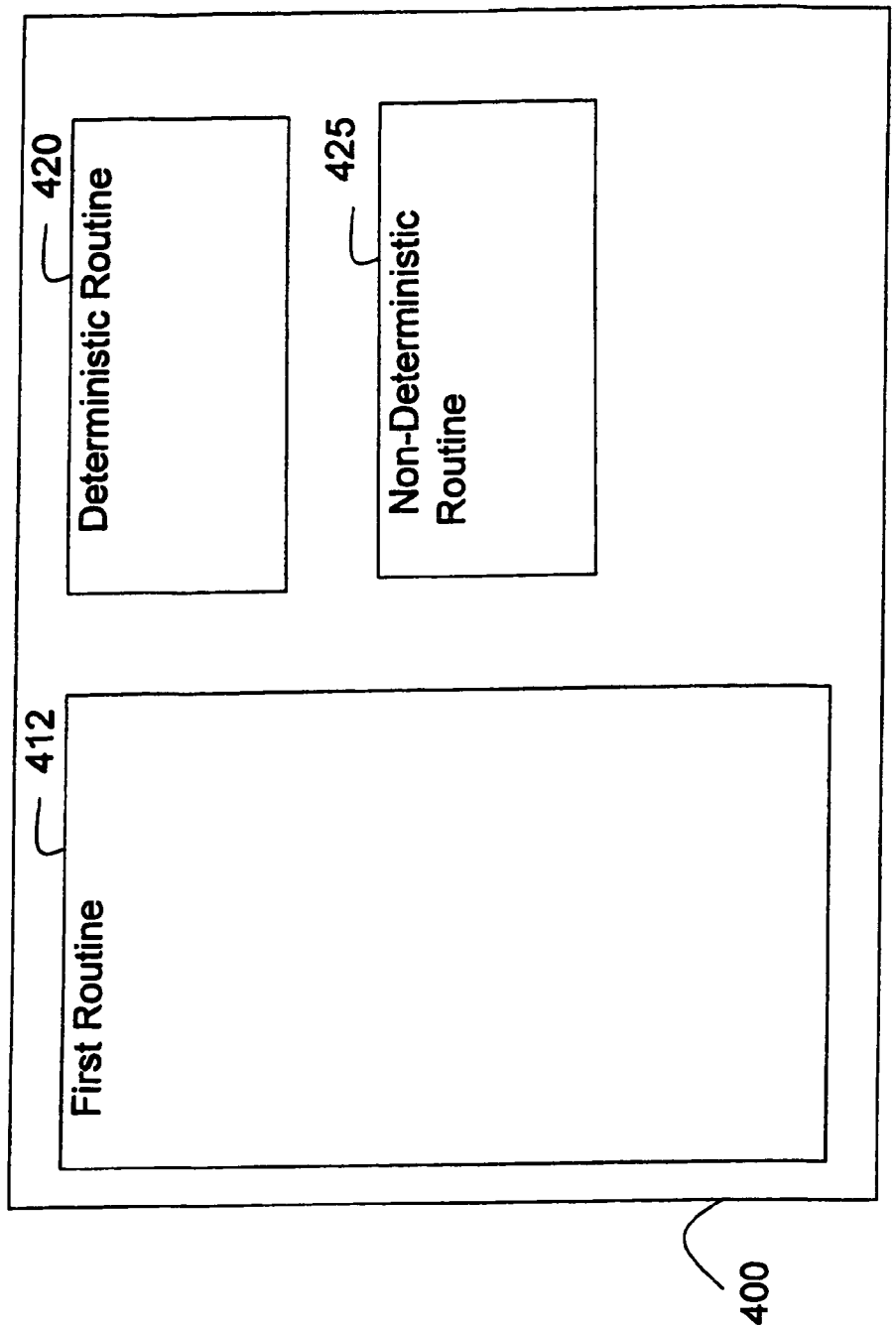
FIG. 6 is a more detailed block diagram of routines that operate on the computing system illustrated in FIG. 1 in accordance with a further exemplary embodiment of the present invention.

With reference to FIGS. 5 and 6, computer system 100 is preferably configured to reduce at least one of five problem domains in the generalized computing arena. Computing system 100 preferably applies partitioning technology via PMU 160 to overcome various computer problems. PMU 160 can be separate from or integrated with unit 140. Alternate PMUs 200 and 240 can also be utilized.

The five problem domains associated are:
1. Network denial service attacks. Denial of service with the generalized computing area attacks (and other internet attacks) succeed by overwhelming a processor with service requests. Allocating one partition via PMU 160 for a routine or virtual machine that serves as a monitor can appropriately respond and prevent this overwhelming attack by providing guaranteed processing capacity to recognize and thwart the attack. In one embodiment, the denial of service attack mode or routine is implemented in a JAVA virtual machine.
2. Virus and spyware software monitor modes. Virus and spyware software has become sophisticated and operates at a system level to prevent removal from the system. Allocating a system partition via PMU 160 to monitor and respond to virus and spyware is less intrusive and more effective than executing conventional anti-virus and anti-spyware software outside of a partition. In one embodiment, separate anti-virus software is executed in a partition and anti-spyware software is executed in another partition. In another embodiment, the anti-virus software and anti-spyware software are combined and operate in a single partition. Preferably, the anti-virus software and anti-spyware software are implemented in a JAVA virtual machine.
3. Separation of deterministic and non-deterministic software such as control loops. Control loop software and robotics mandate deterministic operation. Timing loops must be accurate for feedback loops and their mathematical foundation to operate. Allocating separate partitions via PMU 160 for deterministic and non-deterministic software while sharing the processor allows the processor to support critical timing loops.
4. Power management settings mode. Power management settings can be adjusted or preloaded in a partition. Transitioning from one power management mode to another is preferably handled on a partition basis enforced by PMU 160. Management of dynamic voltage and frequency scaling as well as power settings for peripheral device can be handled at the partition level.
5. Configuration per partition for cache data, peripheral settings, and/or Field Programmable Gate Array (FPGA content). Dynamic changeability can be used to provide the power, performance and security via a partition. Changing and/or pre-loading devices on a partition basis can radically change the operation of the processing system yet reliably transition from one provable, stable state to another provable, stable state.

In FIG. 5, computer system 100 executes software 310. Software 310 operates a first routine 312 in a first partition via PMU 160. First routine 312 can be a JAVA virtual machine or any software related to any function performed in a computer environment. In addition, software 310 includes at least one of a denial of service attacks monitor routine 314, a spyware monitor routine 316, a virus monitor routine 318, a deterministic loop/non-deterministic loop routine 320, a power management routine 322, a configuration routine 324 or a configuration routine 326. Routines 314, 316, 318, 320, 322, 324 and 326 each operate in their own partition as enforced by PMU 160. Configuration routine 324 can be for changing cache data, peripheral settings or FPGA content. Configuration routine 326 can operate a routine for changing at least one of cache data, peripheral settings and FPGA content. Routine 324 is similar to routine 326. Routines 314, 316, 318, 320, 322, 324 and 326 can each be operable as a separate virtual machine, such as a JAVA virtual machine.

According to one exemplary embodiment, PMU 160 allows computer system 100 to enforce configuration changes during partition changes. The partition changes can begin at the end of a first partition and end at the beginning of the next partition.

During partition changes, PMU 160 can control system 100 for short periods. During those short periods, PMU 160 can load the cache, set up registers, obtain data from memory, etc. In a preferred embodiment, PMU 160 can adjust power settings or preload power settings during a transition. In another embodiment, configuration data for cache data peripheral settings and FPGA content can be loaded during transition changes. In one example, if certain power management modes, peripheral settings and/or Field Programmable Gate Array content needs to be changed for the next partition, system 100 makes those changes during transition from one partition to the next.

Alternatively, PMU 160 can make such changes at the end of one transition or at the beginning of the transition for which the change is required. The term during partition changes may include portions of an end of a preceding partition and a beginning of the following partition without departing from the scope of the invention.

Computing system 100 can preferably enforce configuration changes during partition changes for power management mode, and preload or change at least one of the cache data, peripheral settings or FPGA content load. According to one example, peripheral settings such as a network card can be turned on or off during a partition change according to the following partition's need for that peripheral device.

In FIG. 6, computing system 100 operates software 400 including a first routine 412, a deterministic routine 420 and a non-deterministic routine 425. Routines 420 and 425 are operated in separate partitions to protect control loop software or the like. Routine 412, 420 and 425 are each operable in separate partitions as enforced by PMU 160. Routines 412, 420 and 425 can each be a separate JAVA virtual machine.

In one embodiment, computing system 100 is configured to provide a deterministic application in a first partition and at least one non-deterministic application in a second partition. System 100 can be configured for a first partition for a classified application and a second partition for a non-classified application. Alternatively, system 100 can include a first partition for a safety critical application and a second partition for a non-safety critical application. In another alternative, system 100 can be configured for a first partition for a trusted application and a second partition for an untrusted application. In still another alternative, system 100 can be configured for a first partition for a service attack monitor and a second partition for a system services application. System 100 can be configured as with software 400 shown in FIG. 6, including a pair of applications, such as a routine 412 and a routine 420. The routine 412 is for the first in the listed pair above and routine 420 is for the second application in the listed pair above.

It is understood that while the detailed descriptions, specific examples, specific hardware, software, machines and routines discussed provide preferred exemplary embodiments of the present invention, that preferred exemplary embodiments are for the purpose of illustration only. For example, although 5 computing problems are discussed, the present invention may be applied against less than all 5 computing problems, such as only one of the five computing problems. The method and system of the present invention are not limited to the precise details and conditions disclosed. Various changes will be made to the details without departing from the scope of the invention, which is defined by the following claims.

What is claimed is:

1. A computing system, comprising:
   a processor;
   software stored in memory, the software comprising:
      a deterministic software routine, and
      at least one non-deterministic software routine including at least one of a service attack monitor, a virus monitor, and a spyware monitor;
      a partition management unit, the partition management unit allocating partitions of memory and processing time, wherein the partition management unit allocates a first partition to the deterministic software routine and at least a second partition to the at least one non-deterministic software routine, wherein the partition management unit dedicates the first partition to the deterministic software routine and isolates the first partition from the second partition so that the deterministic software routine is not affected by the operation of the routine or routines of the second partition.

2. The computing system of claim 1, wherein the partition management unit is integrated with the processor.

3. The computing system of claim 1, wherein the partition management unit is further configured to cause the processor to read from memory and write to the next partition cache by utilizing one or more processing cycles otherwise dedicated to the current partition to conduct the restoration of the next partition cache to the previous state of the next partition to be active.

4. The computing system of claim 1, wherein the partition management unit provides a separate partition for the virus monitor.

5. The computing system of claim 1, wherein the partition management unit provides a separate partition for the spyware monitor.

6. The computing system of claim 1, wherein the deterministic software routine is a safety critical avionics routine.

7. The computing system of claim 1, wherein the computer system enforces at least one of the following configuration changes during partition changes: 1. a power management mode, 2. peripheral setting changes, and a change relating to an FPGA content mode.

8. The computing system of claim 1, wherein the deterministic software routine is run in a first virtual machine and the routine or routines of the second partition are run in a second virtual machine.

9. The computing system of claim 7, wherein the computer system enforces preload changes or changes to the cache data with the partition change.

10. An apparatus for use in a computing system, the apparatus comprising:
   a processor for executing instructions associated with software, the software including a deterministic routine and at least one second routine including at least one of: 1. a service attack monitor routine, 2. a virus monitor routine, and 3. a spyware monitor routine; and
   wherein the processor includes a management unit configured to isolate the operation of the deterministic routine from the at least one second routine.

11. The apparatus of claim 10, wherein the management unit enforces at least one of the following configuration changes during partition changes: 1. a power management routine, and 2. a preload or change to at least one of a data cache, peripheral settings or FPGA content routine.

12. The apparatus of claim 10, wherein the first routine is implemented in a first virtual machine and the at least one second routine is implemented in a second virtual machine.

13. A method of operating a computing system, the method comprising:
   operating a first virtual machine associated with a first partition;
   operating a second virtual machine associated with a second partition, wherein the first virtual machine operates a classified application and the second virtual machine operates an unclassified application, or wherein the first virtual machine operates a safety critical application and the second virtual machine operates a non-safety critical application, or wherein the first virtual machine operates a trusted application and the second virtual machine operates an untrusted application; and
   maintaining the first virtual machine and the second virtual machine with a partitioning management unit, the partition management unit comprising a partition timer; and
   enforcing peripheral setting changes during partition changes.

14. The method of claim 13, wherein the partition management unit is implemented in hardware.

15. The method of claim 13, further comprising operating a third virtual machine for a deterministic routine, virus monitor routine, a spyware monitor routine, or a service monitor routine.

16. The method of claim 13, further comprising operating a fourth virtual machine associated with a fourth partition.

17. The method of claim 16, wherein the fourth virtual machine operates a deterministic routine.

18. A method for providing an avionics computing system including a partition management unit capable of maintaining partitions between different virtual machines, the method comprising:
   providing a partition management unit capable of maintaining partitions between different virtual machines;
   providing a deterministic software routine configured to run on a first virtual machine;
   providing a non-deterministic software routine on a second virtual machine;
   configuring the partition management unit so that the first virtual machine operates in its own time partition and so that memory read/write protection is provided between the first partition and the second partition;
   wherein the deterministic software routine is one of a safety critical software routine, a classified routine, or a trusted routine and the non-deterministic software routine is at least one of: 1. a service attack monitor, 2. a virus monitor, and 3. a spyware monitor.

19. The method of claim 18, wherein the partition management unit is a hardware partition management unit that provides the primary memory management to the processor and also controls operating system context switching.

* * * * *